Feb. 14, 1928.

R. V. WALLACE

ANIMAL TRAP

Filed Jan. 21, 1927

1,659,063

Inventor

Robert V. Wallace

By C. A. Snow & Co.

Attorneys.

Patented Feb. 14, 1928.

1,659,063

UNITED STATES PATENT OFFICE.

ROBERT V. WALLACE, OF CHENEY, WASHINGTON.

ANIMAL TRAP.

Application filed January 21, 1927. Serial No. 162,521.

The present invention relates to animal traps, and aims to provide novel means whereby an animal may be trapped and held in the body portion of the trap without injury to the animal.

Another object of the invention is to provide a double-ended trap so that an animal may enter at either end of the trap, means being provided within the trap for simultaneously releasing the closures to permit them to move to their closed positions to close the ends of the trap.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawing.

Figure 1:
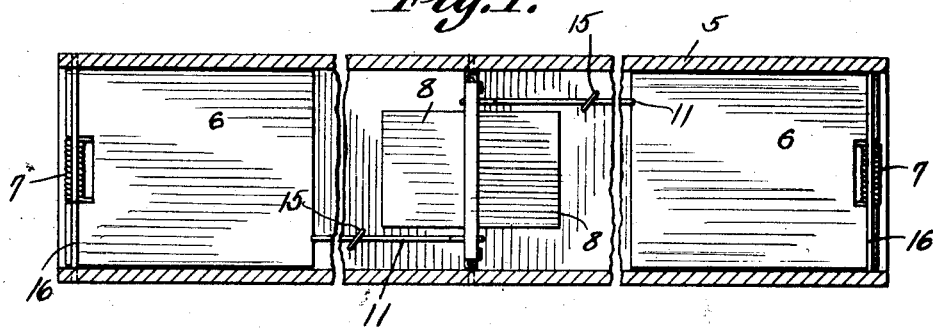
Figure 1 is a longitudinal sectional view through the trap showing the same in a set position.
Figure 2:
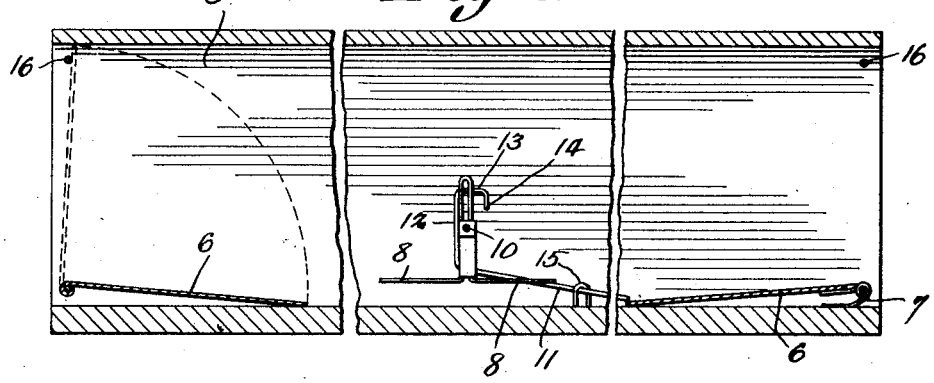
Figure 2 is a longitudinal sectional view taken at right angles to Figure 1, one of the closures being shown in dotted lines in its closed position.
Figure 3:
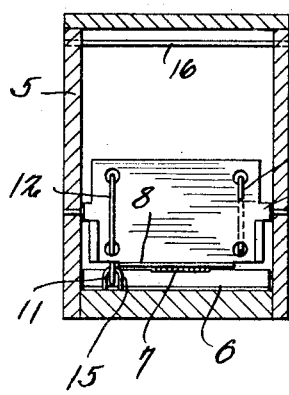
Figure 3 is a transverse sectional view through the trap.
Figure 4:
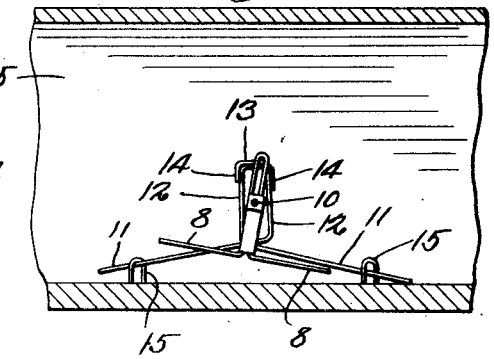
Figure 4 is a fragmental sectional view illustrating the trigger in its operated position.

Referring to the drawing in detail, the trap includes an elongated body portion indicated generally by the reference character 5, which has open ends closed by the hinged closures 6, supported adjacent to the ends, and hinged to the bottom of the body portion by means of the spring hinges 7.

The trigger embodies a length of sheet metal bent intermediate its ends and having outwardly extended tread portions 8 disposed in opposite directions so that a treddle will be disposed towards each closure.

Portions of the trigger at the side edges thereof are cut away to provide bearings 9 that accommodate the shafts 10 operating in suitable openings formed in the side walls of the body portion of the trap.

Adjacent to each side of the trigger are spaced openings through which the rods 11 extend the rods 11 being provided with outwardly extended portions 12, laterally extended portions 13 and downwardly extended portions 14, the lengths of the laterally extended portions 13 being greater than the thickness of that portion of the treddle through which the rods extend so that a slight movement of the treddle will be permitted, without affecting the rods.

The forward ends of the rods 11 pass through the eyes 15, the eyes 15 being disposed adjacent to the free ends of the closures 6 so that when the closures are moved to their open positions, or to positions as shown by Figure 1 of the drawing, the free ends of the rods may be positioned over the free ends of the closures to hold the closures in their open positions.

The bait may be positioned within the trap at a point above the trigger, and supported in any suitable manner so that an animal will be compelled to stand on the treddle in order to obtain the bait.

It is obvious that when an animal passes into the trap, and rests his front feet on the treddle, in an endeavor to obtain the bait, the weight of the animal will cause the trigger to tilt pushing on one of the rods and pulling on the opposite rod, thereby releasing the closures and allowing the closures to swing to their closed positions against the rods 16 disposed at the ends of the trap.

I claim:

1. A trap including an elongated body portion, inwardly swinging closures for closing the ends of the body portion, a trigger pivotally supported at a point intermediate the ends of the body portion and having treddles disposed on opposite sides thereof, rods connected with the trigger and adapted to engage the closures when the closures are in their open positions, said trigger adapted to move independently of the rods, and said trigger adapted to move the rods in opposite directions when one of the treddles is moved downwardly, and said rods adapted to release the closures to close the ends of the body portion.

2. A trap including an elongated body portion having open ends, inwardly swinging closures for normally closing the ends of the body portion, a trigger pivotally supported within the body portion, said trigger including laterally extended treddles, said trigger having pairs of spaced openings adjacent to its side edges, rods extended through the openings and having forwardly and downwardly extended end portions, the forwardly and downwardly extended end portions being of lengths greater than the thickness of the treddle to permit the treddle to move slightly independently of the rods, said rods adapted to overlie the closures to normally hold the closures open, and said trigger adapted to move the rods in opposite directions when one of the treddles is pressed downwardly, to release the closures.

In testimony that I claim the foregoing as my own, I have hereto affixed my signature.

ROBERT V. WALLACE.